United States Patent
Lee et al.

(10) Patent No.: US 8,509,052 B2
(45) Date of Patent: Aug. 13, 2013

(54) CHANNEL INFORMATION GENERATING DEVICE AND METHOD FOR SPATIAL DIVISION MULTIPLEXING ALGORITHM IN A WIRELESS COMMUNICATION SYSTEM, AND DATA TRANSMISSION APPARATUS AND METHOD ADOPTING THE SAME

(75) Inventors: Yong Hwan Lee, Seoul (KR); Jae Yun Ko, Anyang (KR); Seung Hyeon Yang, Seoul (KR)

(73) Assignee: SNU R&DB Foundation, Seoul (KR)

( * ) Notice: Subject to any disclaimer, the term of this patent is extended or adjusted under 35 U.S.C. 154(b) by 343 days.

(21) Appl. No.: 12/991,426

(22) PCT Filed: May 6, 2009

(86) PCT No.: PCT/KR2009/002371
§ 371 (c)(1),
(2), (4) Date: Nov. 26, 2010

(87) PCT Pub. No.: WO2009/136728
PCT Pub. Date: Nov. 12, 2009

(65) Prior Publication Data
US 2011/0261675 A1    Oct. 27, 2011

(30) Foreign Application Priority Data
May 7, 2008 (KR) .......... 10-2008-0042346

(51) Int. Cl.
*H04J 11/00* (2006.01)
(52) U.S. Cl.
USPC .......................... 370/203; 370/310

(58) Field of Classification Search
USPC .......................... 370/203, 310, 437, 252, 342
See application file for complete search history.

(56) References Cited

U.S. PATENT DOCUMENTS

| | | | |
|---|---|---|---|
| 2004/0141466 A1* | 7/2004 | Kim et al. ................ | 370/252 |
| 2007/0206626 A1* | 9/2007 | Lee et al. ................ | 370/437 |
| 2007/0265037 A1 | 11/2007 | Pan et al. | |
| 2007/0297529 A1 | 12/2007 | Zhou et al. | |
| 2008/0080459 A1* | 4/2008 | Kotecha et al. ............ | 370/342 |

OTHER PUBLICATIONS

International Search Report for PCT/KR2009/002371 filed May 6, 2009.

* cited by examiner

*Primary Examiner* — Chi Pham
*Assistant Examiner* — Fahmida Chowdhury

(57) ABSTRACT

Provided are a channel information generation apparatus and a method for spatial division multiplexing in a wireless communication system and a data transmission apparatus and a method using generated channel information. The channel information generation apparatus performs spatial division multiplexing in an OFDM-based wireless communication system. The channel information generation apparatus includes a codebook storage unit for storing a predefined codebook, a channel correlation information unit that receives channel information corresponding to each of a plurality of sub-carriers and calculates channel correlation coefficient information between the sub-carriers based on the received channel information, and an index calculation unit that calculates an index of an optimal matrix of matrices stored in the codebook storage unit based on the channel information, the channel correlation coefficient information, and the codebook.

21 Claims, 6 Drawing Sheets

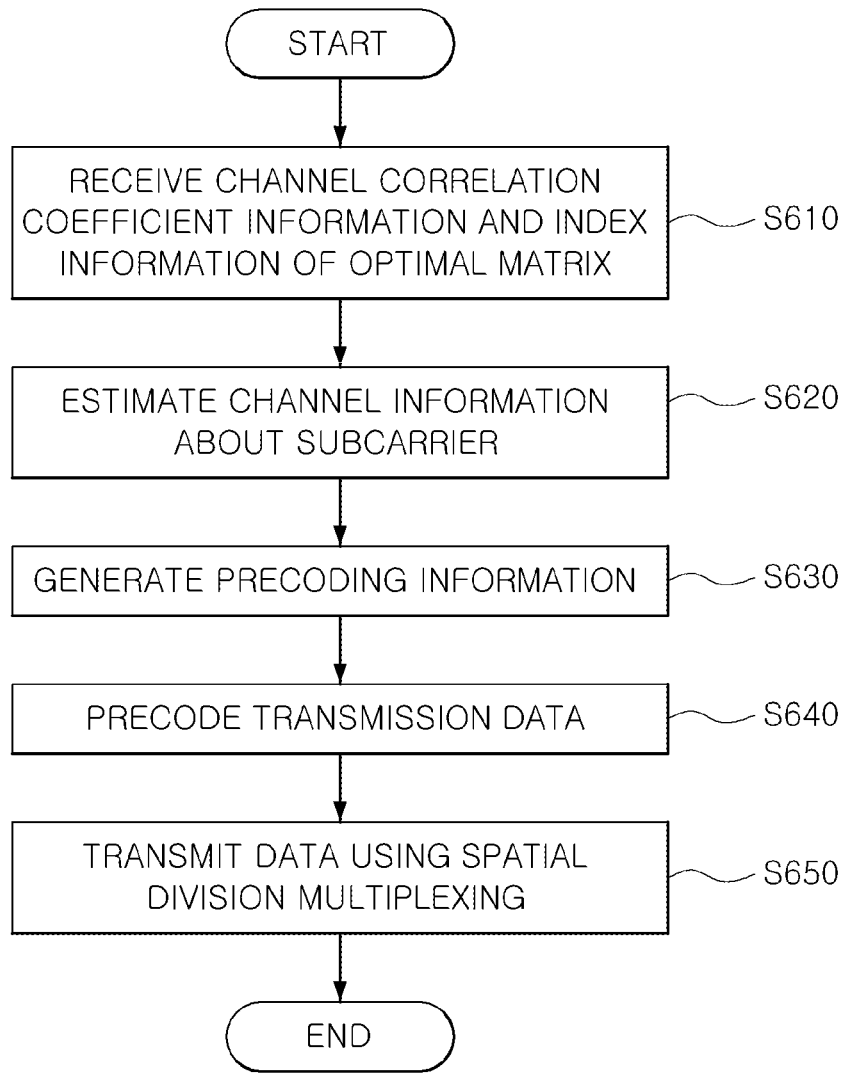

CHANNEL INFORMATION GENERATING DEVICE AND METHOD FOR SPATIAL DIVISION MULTIPLEXING ALGORITHM IN A WIRELESS COMMUNICATION SYSTEM, AND DATA TRANSMISSION APPARATUS AND METHOD ADOPTING THE SAME

BACKGROUND OF THE INVENTION

1. Field of the Invention

The present invention relates, in general, to the generation of channel information and the transmission of data using the channel information, and, more particularly, to a channel information generation apparatus and method for Spatial Division Multiplexing (SDM) in a wireless communication system and a data transmission apparatus and method using generated channel information, which generate channel information using frequency correlations between the channels of adjacent subcarriers, transmit the generated channel information to the transmitter, and allow the transmitter to generate a precoding matrix on the basis of the received information and to transmit data using SDM so that data can be transmitted using SDM in an Orthogonal Frequency Division Multiplexing (OFDM)-based wireless communication system that uses Multiple-Input Multiple-Output (MIMO) antennas.

2. Description of the Related Art

In a wireless communication system that uses Multiple-Input Multiple-Output (MIMO) antennas, when a transmitter can use channel information, system capacity can be greatly increased using an SDM transmission method combined with a precoding technique (A. Scaglione, P. Stoica, S. Barbarossa, G. B. Giannakis, and H. Sampath, "Optimal designs for space-time linear precoders and decoders," *IEEE Trans. Signal Process., vol.* 50, no. 5, pp. 1051-1064, May 2002.).

In this case, when an uplink channel and a downlink channel are not reciprocal as in the case of Frequency Division Duplexing (FDD), a transmitter can obtain channel information from the receiver. Here, the channel information can be obtained using a quantization technique such as a Grassmannian codebook technique so as to reduce the amount of feedback signal information (D. J. Love, and R. W. Heath Jr., "Limited feedback unitary precoding for spatial multiplexing systems," *IEEE Trans. Inform. Theory*, vol. 51, no. 8, pp. 2967-2976, August 2005.).

Such a codebook-based technique adopts a scheme for searching a codebook, which contains channel information predefined by a transmitter/receiver, for optimal channel information, and feeding index information corresponding to the optimal channel information back to the transmitter. In particular, a Grassmannian codebook technique can efficiently generate a codebook using a small amount of information in consideration of the characteristics of a precoding matrix being independent of phase.

Meanwhile, an OFDM technique is advantageous in that MIMO techniques can be easily applied thereto because a frequency-selective channel environment can be converted into a plurality of frequency non-selective environments. Accordingly, recently, research into MIMO-OFDM systems in which a MIMO technique is combined with an OFDM technique to obtain a high transfer rate has been widely conducted.

In such a MIMO-OFDM system, in order to implement an SDM technique combined with a precoding technique, a transmitter needs to obtain channel information about each subcarrier from the receiver. Accordingly, the amount of feedback burden required to obtain channel information increases in proportion to the number of subcarriers that are used. An example of a method of reducing such a feedback burden may include a method of gathering a plurality of adjacent subcarriers into one cluster and feeding back only channel information corresponding to the representative subcarrier of the cluster. This clustering technique can reduce the amount of feedback information in proportion to the size of the cluster, but is disadvantageous in that as the size of the cluster increases, system performance is reduced.

As a method of overcoming the disadvantage of reduced system performance, research into an interpolation-based technique using interpolation has been conducted (J. Choi and R. W. Heath, Jr., "Interpolation based unitary precoding for spatial multiplexing MIMO-OFDM with limited feedback," *IEEE Trans. Signal. Process.*, vol. 54, no. 12, pp. 4730-4740, August 2006). However, such an interpolation technique is disadvantageous in that when a Grassmannian codebook is used, phase information for interpolation is additionally required due to the characteristics of the codebook being independent of phase, thus increasing the amount of feedback information.

Recently, in order to compensate for the disadvantages of an interpolation technique, a technique for reducing the amount of feedback information using correlations between adjacent subcarriers among OFDM subcarriers has been proposed (S. Zhou, B. Li and P. Willett, "Recursive and trellis-based feedback reduction for MIMO-OFDM with rate-limited feedback," *IEEE Trans. Wireless Commun.*, vol. 5, no. 12, pp. 3400-3405, December 2006). However, a problem still remains in that as the number of subcarriers increases, the amount of feedback information increases.

SUMMARY OF THE INVENTION

Accordingly, the present invention has been made keeping in mind the above problems occurring in the prior art, and an object of the present invention is to provide a channel information generation apparatus and method for spatial division multiplexing in a wireless communication system and a data transmission apparatus and method using generated channel information, which feed back both channel correlation coefficient information between adjacent subcarriers and the index information of an optimal matrix of matrices, prestored in a codebook, to the transmitter, thus improving a transfer rate while reducing the amount of feedback channel information.

Another object of the present invention is to provide a channel information generation apparatus and method for spatial division multiplexing in a wireless communication system and a data transmission apparatus and method using generated channel information, which use a codebook containing phase information, so that there is no need to feed back additional phase information even if an interpolation technique is used, thus improving system performance.

A further object of the present invention is to provide a channel information generation apparatus and method for spatial division multiplexing in a wireless communication system and a data transmission apparatus and method using generated channel information, which can generate a precoding matrix on the basis of channel correlation coefficient information and the index information of an optimal matrix, which have been fed back from the receiver, and can perform spatial division multiplexing using the generated precoding matrix.

In accordance with an aspect of the present invention to accomplish the above objects, there is provided a channel information generation apparatus for spatial division multiplexing in an Orthogonal Frequency Division Multiplexing (OFDM)-based wireless communication system which uses Multiple-Input Multiple-Output (MIMO) antennas, including a codebook storage unit for storing a predefined codebook, a channel correlation information calculation unit for receiving channel information corresponding to each of subcarriers, and calculating channel correlation coefficient information between the subcarriers based on the channel information, an index calculation unit for calculating an index of an optimal matrix of matrices stored in the codebook storage unit, based on the channel information, the channel correlation coefficient information, and the codebook, and a transmission unit for transmitting the channel correlation coefficient information and information about the index of the optimal matrix to the transmitter.

Preferably, the index calculation unit may estimate channel information about a k-th subcarrier based on the channel correlation coefficient information, the codebook, and estimated channel information about a (k−1)-th subcarrier, and calculate an index of an optimal matrix for the k-th subcarrier based on channel information and the estimated channel information about the k-th subcarrier.

Preferably, the channel correlation information calculation unit may calculate channel correlation coefficient information about a predefined representative one of subcarriers constituting a cluster into which a plurality of adjacent subcarriers is gathered, when information about the cluster is received, the index calculation unit may calculate an index of an optimal matrix corresponding to the representative subcarrier, and the transmission unit may transmit the channel correlation coefficient information and information about the index of the optimal matrix, which correspond to the representative subcarrier, to a data transmission apparatus.

In accordance with another aspect of the present invention to accomplish the above objects, there is provided a data transmission apparatus using generated channel information for spatial division multiplexing in an Orthogonal Frequency Division Multiplexing (OFDM)-based wireless communication system which uses Multiple-Input Multiple-Output (MIMO) antennas, including a codebook storage unit for storing a predefined codebook, a reception unit for receiving from the receiver, channel correlation coefficient information between subcarriers and index information, a channel estimation unit for estimating channel information based on both the channel correlation coefficient information and a matrix corresponding to the index among matrices constituting the codebook, and a precoding generation unit for generating precoding information so that data can be transmitted based on the estimated channel information via spatial division multiplexing.

In accordance with a further aspect of the present invention to accomplish the above objects, there is provided a channel information generation method for spatial division multiplexing in an Orthogonal Frequency Division Multiplexing (OFDM)-based wireless communication system which uses Multiple-Input Multiple-Output (MIMO) antennas, including receiving channel information corresponding to each of subcarriers, calculating channel correlation coefficient information between the subcarriers based on the received channel information, calculating an index of an optimal matrix of matrices constituting a prestored codebook, based on the channel information, the channel correlation coefficient information, and the codebook, and transmitting the channel correlation coefficient information and information about the index of the optimal matrix to the transmitter.

In accordance with yet another aspect of the present invention to accomplish the above objects, there is provided a data transmission method using generated channel information for spatial division multiplexing in an Orthogonal Frequency Division Multiplexing (OFDM)-based wireless communication system which uses Multiple-Input Multiple-Output (MIMO) antennas, including receiving channel correlation coefficient information between subcarriers and index information from the receiver, estimating channel information based on the channel correlation coefficient information and a matrix corresponding to the index information among matrices constituting a codebook, and generating precoding information so that data can be transmitted based on the estimated channel information via spatial division multiplexing.

BRIEF DESCRIPTION OF THE DRAWINGS

FIG. 6 is an operating flowchart showing a data transmission method using spatial division multiplexing according to an embodiment of the present invention.

DESCRIPTION OF THE PREFERRED EMBODIMENTS

Figure 1:
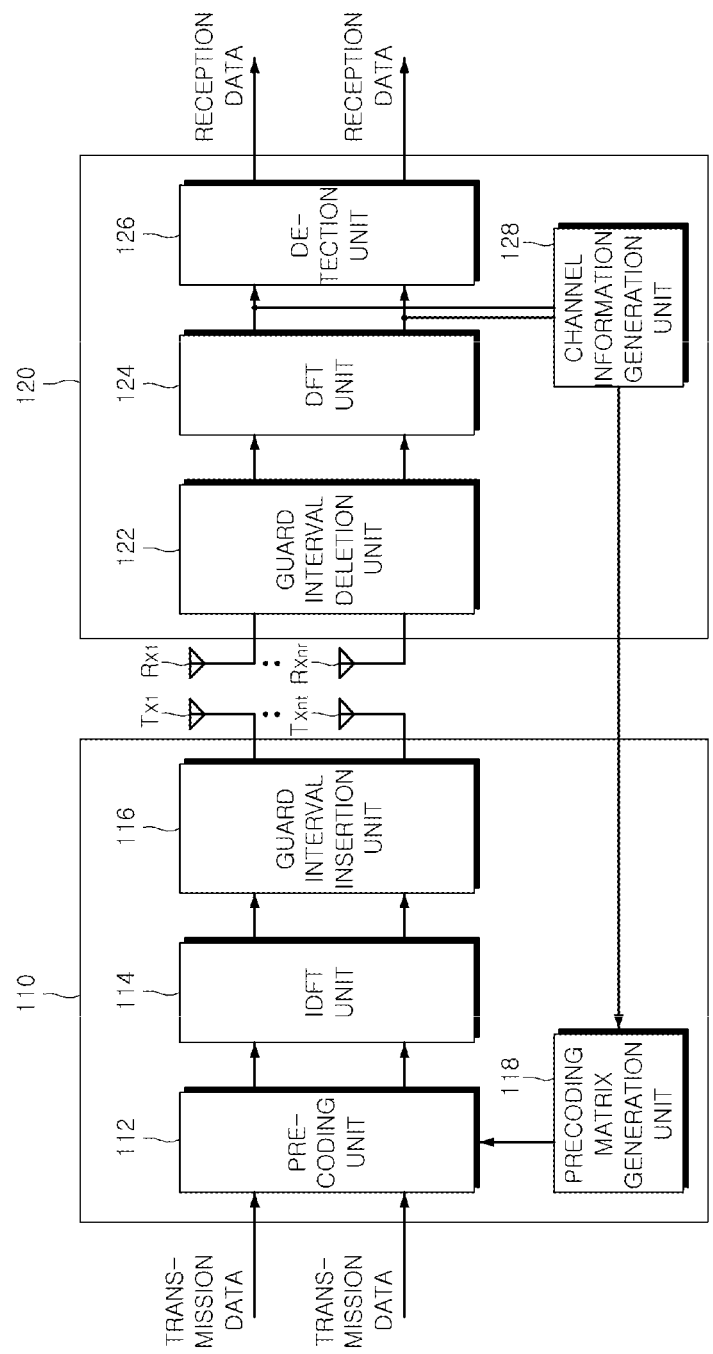
FIG. 1 is a diagram showing the construction of a MIMO-OFDM wireless communication system according to an embodiment.

The above and other objects, features and advantages of the present invention will be more clearly understood from the following detailed description taken in conjunction with the accompanying drawings.

Hereinafter, embodiments of the present invention will be described in detail with reference to the attached drawings. Reference now should be made to the drawings, in which the same reference numerals are used throughout the different drawings to designate the same or similar components. Further, in the description of the present invention, if detailed descriptions of related well-known constructions or functions are determined to make the gist of the present invention unclear, the detailed descriptions will be omitted.

Hereinafter, embodiments of a channel information generation apparatus and method for spatial division multiplexing in a wireless communication system and a data transmission apparatus and method using generated channel information according to the present invention will be described in detail with reference to FIGS. 1 to 6.

FIG. 1 is a diagram showing the construction of a MIMO-OFDM wireless communication system according to an embodiment.

Referring to FIG. 1, the wireless communication system includes a transmitter 110 for transmitting data and a receiver 120 for receiving the data from the transmitter 110.

Here, the transmitter 110 is a device for transmitting data and the receiver 120 is a device for receiving data from the transmitter 110 of a base station.

The transmitter 110 includes a precoding unit 112, an Inverse Discrete Fourier Transform (IDFT) unit 114, a guard interval insertion unit 116, and a precoding matrix generation unit 118.

The precoding unit 112 precodes transmission data on the basis of precoding information, that is, a precoding matrix, generated by the precoding matrix generation unit 118.

The IDFT unit 114 modulates frequency-domain OFDM signals, obtained by precoding the transmission data using the precoding unit 112, into time-domain OFDM signals.

The guard interval insertion unit 116 copies tail portions of the OFDM signals modulated by the IDFT unit 114 and inserts the copied tail portions into head portions of the OFDM signals as guard intervals so as to prevent Inter-Symbol Interference (ISI) from occurring in a multipath environment, and then transmits the OFDM signals with the guard intervals inserted thereto to the receiver 120 via multiple transmitting antennas $Tx_1$ to $Tx_{nt}$.

The precoding matrix generation unit 118 receives information about a channel correlation coefficient and information about the index of each OFDM subcarrier from the receiver 120, and generates a precoding matrix based on the received channel correlation coefficient information and the index information.

In this case, the precoding matrix generation unit 118 estimates channel information, that is, a channel matrix, on the basis of the channel correlation coefficient information and the index information, and may generate a precoding matrix based on the estimated channel matrix.

The estimated channel matrix is obtained by estimating a channel matrix using both a matrix corresponding to the index information, among matrices constituting a prestored codebook, and the channel correlation coefficient information. The channel matrix can be estimated by the following Equation (1):

$$\hat{H}(k) \approx \rho \hat{H}(k-1) + \sqrt{n_t}\sqrt{1-|\rho|^2}Z^* \quad (1)$$

where $n_t$ denotes the number of transmit antennas, $\rho$ denotes channel correlation coefficient information, Z is a matrix corresponding to the index among the matrices constituting the codebook, k denotes the index of a subcarrier, $\hat{H}(k)$ denotes estimated channel information and denotes a matrix indicating the estimated channel of a k-th subcarrier, and * denotes a complex transpose.

As shown in Equation (1), the precoding matrix generation unit 118 estimates the channel matrix of the k-th subcarrier which is a relevant subcarrier, by using the estimated channel matrix of a (k-1)-th subcarrier which is a previous subcarrier, and the matrix of the codebook corresponding to both the channel correlation coefficient information and the index information which are received from the receiver 120. In this case, since the precoding matrix generation unit 118 is fed back from the receiver 120 with only an index corresponding to the optimal matrix stored in the codebook, rather than the optimal matrix itself, it can reduce the amount of feedback information, and can generate a precoding matrix required for spatial division multiplexing using such an index. In this way, the precoding matrix generation unit 118 generates the precoding matrix using the channel matrix estimated by Equation (1).

A procedure for generating Equation (1) required to estimate the channel matrix according to the present invention will be described below.

It is assumed that a channel matrix H(k) is a matrix indicating the channel characteristics of a k-th subcarrier and having a size of $n_r \times n_t$, and is a complex Gaussian random matrix in which the average of individual elements of the channel matrix H(k) is 0 and the variance of the elements is 1 in a Rayleigh fading environment. The channel matrix H(k) can be calculated by the following Equation (2) using the channel correlation coefficient information between individual subcarriers, $$H(k) = \rho H(k-1) + \sqrt{1-|\rho|^2}E \quad (2)$$

where $\rho$ denotes the channel correlation coefficient information, and E denotes a $n_r \times n_t$ matrix and whose entries are zero mean i.i.d. complex Gaussian random variables with variance 1.

In this case, E can be approximated as shown in Equation (3) when the number of multiple transmitting antennas is four or more, $$EE^* \approx n_t I_{n_r} \quad (3)$$

where $I_{n_r}$ denotes a unit matrix having a form of $n_r \times n_r$.

In this case, E* has the characteristics that individual column vectors are orthogonal, and E can be defined by the following Equation (4) using an orthonormal matrix Z having a size of $n_r \times n_r$.

$$E = \sqrt{n_t}Z^* \quad (4)$$

In this case, the orthonormal matrix Z denotes the matrix stored in the codebook of the transmitter 110 and the receiver 120.

Therefore, Equation (3) can be represented by the following Equation (5) with reference to Equation (4).

$$Z^*Z \approx I_{n_r} \quad (5)$$

Using Equation (5), the estimated channel information $\hat{H}(k)$ can be obtained as shown in Equation (1).

The precoding matrix generation unit 118 estimates the channel matrix using Equation (1) which is obtained by Equations (2) to (5), and generates the precoding matrix based on the estimated channel matrix.

Further, when the transmitter 110 transmits a cluster composed of a plurality of adjacent subcarriers, the precoding matrix generation unit 118 receives channel correlation coefficient information and the index information of a representative subcarrier, which represents the cluster, from the receiver 120, estimates a channel matrix for the representative subcarrier, and estimates channel matrices for the remaining subcarriers constituting the cluster by using the estimated channel matrix for the representative subcarrier.

In this case, the precoding matrix generation unit 118 can estimate the channel matrices for the remaining subcarriers using interpolation. The channel matrices for the remaining subcarriers can be estimated by the following Equation (6):

$$\hat{H}(mK + l) = \left(1 - \frac{l}{K}\right)\hat{H}(mK) + \frac{l}{K}\hat{H}(mK + K) \quad (6)$$

where K denotes the size of the cluster, m denotes an integer equal to or greater than 0, l denotes a difference between index of the current subcarrier and that of representative subcarrier, and $\hat{H}(mK)$ denotes the estimated channel matrix for the representative subcarrier of an (m+1)-th cluster.

That is, the precoding matrix generation unit 118 estimates channel matrices for the representative subcarriers of respective clusters, and estimates channel matrices for the remaining subcarriers using an interpolation technique based on the estimated channel matrices for the representative subcarriers.

As seen in the estimation of channel matrices using the clustering technique, the present invention is advantageous in that only channel correlation coefficient information and index information corresponding to representative subcarriers, rather than channel correlation coefficient information and index information corresponding to all subcarriers, are fed back, thus decreasing the amount of feedback information.

Of course, when only index information is received from the receiver 120, the precoding matrix generation unit 118 can estimate a channel matrix using channel correlation coefficient information that was used to estimate the channel matrix of a previous subcarrier, thus further decreasing the amount of feedback information. The reason for enabling the estimation of the channel matrix using only the received index information in this way is that the channel correlation coefficient information is a value which does not change rapidly with time. Therefore, the precoding matrix generation unit 118 must receive the channel correlation coefficient information from the receiver at regular periods.

As described above, since the present invention estimates channel information using a small amount of feedback information, it is possible to estimate more accurate channel information than conventional systems if it is assumed that the present invention uses the same amount of feedback information as the conventional systems, thus improving system performance.

Next, the receiver for calculating channel correlation coefficient information and index information and feeding back the calculated information to the transmitter will be described below.

The receiver 120 includes a guard interval deletion unit 122, a DFT unit 124, a detection unit 126, and a channel information generation unit 128.

The guard interval deletion unit 122 deletes guard intervals from received OFDM signals when the OFDM signals are received from the multiple transmitting antennas of the transmitter 110 via $n_R$ multiple receiving antennas $Rx_1$ to $Rx_{nr}$.

The DFT unit 124 modulates time-domain OFDM signals from which guard intervals have been deleted by the guard interval deletion unit 122 into frequency-domain OFDM signals.

The detection unit 126 detects the received data from the OFDM signals modulated by the DFT unit 124.

The channel information generation unit 128 calculates channel correlation coefficient information between adjacent subcarriers and the index information of an optimal matrix corresponding to a relevant subcarrier among matrices constituting a codebook, on the basis of the channel information calculated by the receiver 120 and the matrices constituting the codebook, and feeds back the calculated information to the transmitter 110.

In this case, a procedure in which the receiver 120 estimates channel information on the basis of the received OFDM signals is apparent to those skilled in the art, and thus a detailed description thereof is omitted.

That is, the receiver 120 estimates channel information based on the OFDM signals received via the multiple receiving antennas.

Therefore, the channel information generation unit 128 calculates channel correlation coefficient information on the basis of the channel information estimated by the receiver 120, and calculates the index of an optimal matrix corresponding to a relevant subcarrier on the basis of the calculated channel correlation coefficient information, the channel information, and the matrices stored in the codebook.

Here, the calculated index refers to the index of the optimal matrix of the matrices constituting the codebook.

Next, the procedure in which the channel information generation unit 128 calculates the channel correlation coefficient information and the index information of the optimal matrix of the matrices stored in the codebook will be described in more detail.

When the transmission signals transmitted from the transmitter 110 are assumed to be s(k), signals that are received via the multiple receiving antennas of the receiver 120 can be represented by the following Equation (7):

$$r(k)=H(k)F(k)s(k)+n(k), k=0, \ldots, N_c-1 \tag{7}$$

where r(k) denotes signals received via the multiple receiving antennas, r(k) denotes a matrix having a size of $n_r \times n_s$ required to precode $N_s$ pieces of data corresponding to a k-th subcarrier, n(k) denotes an additive noise component in which the average of individual elements is 0 and the variance of the elements is $N_0$, and in which the individual elements are independent of one another and have the same distribution, and $N_C$ denotes the number of OFDM subcarriers. Here, the power of the transmission signals is assumed to be $\epsilon_s$.

In this case, the channel matrix H(k) can be represented by the following Equation (8) using the channel correlation coefficient information between the individual subcarriers.

The channel correlation coefficient information ρ can be calculated by the following Equation (8) on the basis of the above Equation (2):

$$\rho = \frac{E\{\tilde{h}^*(k)\tilde{h}(k-1)\}}{\sqrt{E\{\|\tilde{h}(k)\|^2\}}\sqrt{E\{\|\tilde{h}(k-1)\|^2\}}}, \tag{8}$$

$$\tilde{h}(k) = vec(H(k))$$

where vec(H(k)) denotes an operator for sequentially arranging the columns of the matrix H(k) and configuring the columns in the form of a vector.

As shown in Equation (8), it can be seen that the channel information generation unit 128 can calculate the channel correlation coefficient information on the basis of the channel information H(k) generated by the receiver 120.

Further, the channel information generation unit 128 calculates the index of the optimal matrix of the matrices stored in the codebook. Here, the index of the optimal matrix can be calculated using a method of maximizing system capacity, a method of minimizing transmission/reception error probability, a method of optimizing other performance parameters of the system, etc.

For example, the index of the optimal matrix which can maximize system capacity can be calculated by the above Equation (1) and the following Equation (9):

$$\hat{Z} = \underset{Z \in W}{\operatorname{argmax}}\left(\log_2 \det\left(I_{N_s} + \frac{\varepsilon_s}{N_s N_0}\hat{F}^*(k)H^*(k)H(k)\hat{F}(k)\right)\right) \tag{9}$$

where $\hat{Z}$ denotes the index of the optimal matrix of the matrices constituting the codebook, $\hat{F}(k)$ denotes a matrix composed of first $N_s$ columns of a matrix obtained by performing a singular value decomposition procedure on the estimated channel matrix $\hat{H}(k)$, and W denotes the codebook.

As another example, the channel information generation unit 128 can calculate the index of the optimal matrix which can minimize Mean Square Error (MSE) by the above Equation (1) and the following Equation (10):

$$\hat{Z} = \underset{Z \in W}{\arg\min}\, tr\left(\frac{\varepsilon_s}{N_s}\left(I_{N_s} + \frac{\varepsilon_s}{N_s N_0}\hat{F}^*(k)H^*(k)H(k)\hat{F}(k)\right)^{-1}\right) \quad (10)$$

where tr( ) denotes a trace operation of the matrix.

That is, the channel information generation unit 128 estimates channel matrices for respective matrices constituting the codebook by using the matrices constituting the codebook, the calculated channel correlation coefficient information, and the above Equation (1). Further, the channel information generation unit 128 calculates the index $\hat{Z}$ of the optimal matrix of the matrices constituting the codebook on the basis of the channel matrix $\hat{H}(k)$ estimated using Equation (9) or (10), the channel matrix H(k) calculated by the receiver 120, and the estimated precoding matrix $\hat{F}(k)$.

The channel correlation coefficient information and the index information of the optimal matrix which have been calculated using the above procedure are fed back from the receiver 120 to the transmitter 110.

Of course, when a plurality of adjacent subcarriers is gathered into a cluster, it is also possible to calculate channel correlation coefficient information about a predefined representative one of the subcarriers constituting the cluster and the index of the optimal matrix for the representative subcarrier, and to feed back the results of the calculation to the transmitter 110.

Furthermore, the codebook provided in the transmitter and receiver according to the present invention can be generated using various methods. For example, the codebook can be generated by the following Equation (11):

$$W = \arg\max_{X \in U_{n_t, N_s}^N} \delta(X) \quad (11)$$

$$\delta(X) = \min_{1 \leq i \leq j \leq N} \|X_i - X_j\|$$

where $U_{n_t, N_s}^N$ denotes a set of codebooks, each composed of N ($N_t \times N_s$) matrices, in which the individual column vectors of each matrix have orthonormal characteristics, and $\delta(X)$ denotes the geometric distance between any two matrices $X_i$ and $X_j$ of the matrices constituting a codebook X.

It can be seen in Equation (11) that the minimum values of the geometric distances between any two matrices constituting each codebook in the codebook set are calculated, and a codebook having the maximum of the calculated minimum values is generated as the codebook of the transmitter 110 and the receiver 120.

Since the codebook generated by Equation (11) contains phase information, there is an advantage in that the amount of feedback information required to generate a precoding matrix for spatial division multiplexing using a clustering technique and an interpolation technique can be reduced because there is no need to additionally feed back phase information unlike the conventional technology.

Figure 2:
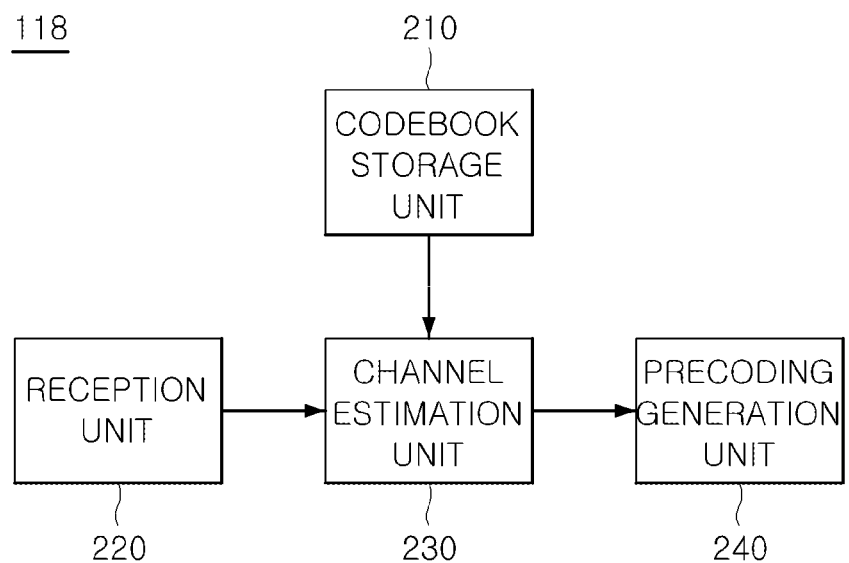
FIG. 2 is a diagram showing the construction of the precoding matrix generation unit of FIG. 1 according to an embodiment.

FIG. 2 is a diagram showing the construction of the precoding matrix generation unit 118 of FIG. 1 according to an embodiment.

Referring to FIG. 2, the precoding matrix generation unit 118 includes a reception unit 220, a codebook storage unit 210, a channel estimation unit 230, and a precoding generation unit 240.

The reception unit 220 receives information fed back from the receiver 120, that is, channel correlation coefficient information between adjacent OFDM subcarriers and index information of an optimal matrix for a relevant subcarrier.

The codebook storage unit 210 stores a codebook predefined by the transmitter 110, for example, the codebook generated using Equation (11).

Here, the codebook may be composed of a plurality of random matrices that are generated in compliance with predetermined rules, and the codebook generated by Equation (11) may include phase information.

The channel estimation unit 230 estimates channel information about a relevant subcarrier, that is, a channel matrix, on the basis of the channel correlation coefficient information and the index information of the optimal matrix which have been received by the reception unit 220.

That is, the channel estimation unit 230 detects a random matrix, corresponding to the index of the optimal matrix, from the codebook storage unit 210, and estimates the channel matrix on the basis of the detected random matrix, an estimated channel matrix for a previous subcarrier, and the channel correlation coefficient information. In this case, the channel matrix for the relevant subcarrier is estimated based on the above Equation (1).

In this case, the transmitter 110 may transmit a cluster composed of a plurality of adjacent subcarriers. When channel correlation coefficient information and index information corresponding to a representative subcarrier, which represents the cluster, are fed back from the reception unit 220, the channel estimation unit 230 can estimate a channel matrix for the representative subcarrier using Equation (1), and can estimate channel matrices for the remaining subcarriers constituting the cluster using the estimated channel matrix for the representative subcarrier on the basis of the method in Equation (6) or the like.

The precoding generation unit 240 generates a precoding matrix and outputs the precoding matrix to the precoding unit 112 so that transmission data can be transmitted via spatial division multiplexing on the basis of the channel matrix estimated by the channel estimation unit 230.

Figure 3:
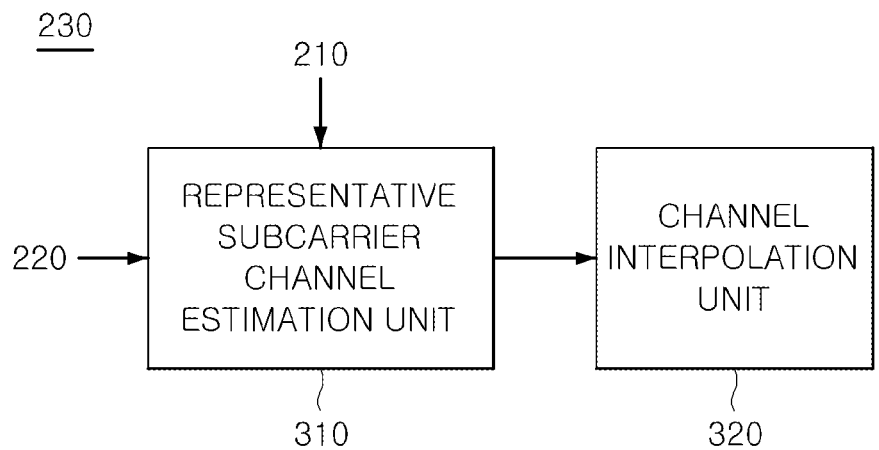
FIG. 3 is a diagram showing the construction of the channel estimation unit of FIG. 2 according to an embodiment.

FIG. 3 is a diagram showing the construction of the channel estimation unit of FIG. 2 according to an embodiment, and shows the transmitter transmitting transmission data using a clustering technique.

Referring to FIG. 3, the channel estimation unit 230 may include a representative subcarrier channel estimation unit 310 and a channel interpolation unit 320.

The representative subcarrier channel estimation unit 310 estimates a channel matrix for a representative subcarrier using both channel correlation coefficient information and index information which correspond to the representative subcarrier of a cluster received by the reception unit 220.

The channel interpolation unit 320 estimates the channel matrices of the remaining subcarriers constituting the cluster using an interpolation technique based on the channel matrix of the representative subcarrier which has been estimated by the representative subcarrier channel estimation unit 310.

For example, when estimating the channel matrices of the remaining subcarriers using a linear interpolation technique, the channel interpolation unit 320 can estimate the channel matrices of the remaining subcarriers using the above Equation (6).

It is apparent that the channel interpolation unit 320 may estimate channel matrices for the remaining subcarriers by applying various interpolation techniques applicable to the present invention depending on circumstances as well as the linear interpolation technique.

Figure 4:
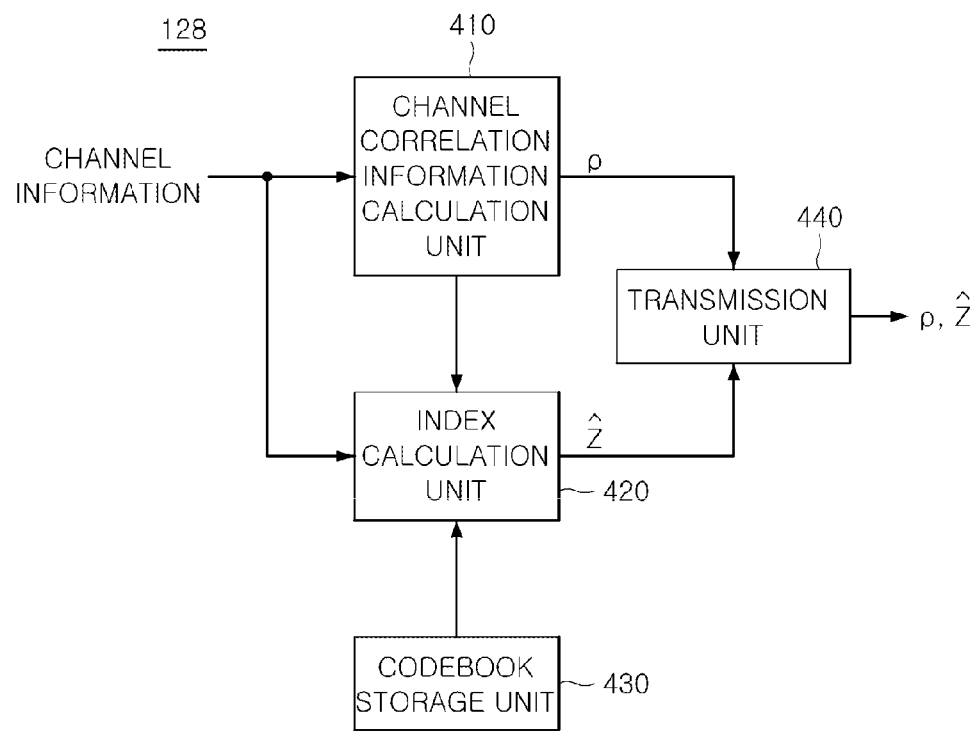
FIG. 4 is a diagram showing the construction of the channel information generation unit of FIG. 1 according to an embodiment.

FIG. 4 is a diagram showing the construction of the channel information generation unit of FIG. 1 according to an embodiment.

Referring to FIG. 4, the channel information generation unit 128 includes a channel correlation information calculation unit 410, an index calculation unit 420, a codebook storage unit 430, and a transmission unit 440.

The codebook storage unit 430 stores a predefined codebook, wherein the same codebook as the codebook stored in the codebook storage unit 210 of the transmitter is stored.

The channel correlation information calculation unit 410 receives channel information calculated based on the OFDM signals received by the receiver 120, and calculates channel correlation coefficient information $\rho$ between adjacent subcarriers on the basis of the received channel information.

In this case, the channel correlation information calculation unit 410 can calculate the channel correlation coefficient information using the above Equation (8).

The index calculation unit 420 calculates the index $\hat{z}$ of the optimal matrix of random matrices constituting the codebook on the basis of the channel information about a relevant subcarrier, the channel correlation coefficient information calculated by the channel correlation information calculation unit 410, and the codebook stored in the codebook storage unit 430.

In this case, the index calculation unit 420 can calculate the index using various methods, for example, a method of maximizing system capacity, a method of minimizing transmission/reception error probability, a method of optimizing other performance parameters of the system, etc. For example, the index calculation unit 420 can calculate the index of the optimal matrix corresponding to the relevant subcarrier using either Equations (1) and (9) or Equations (1) and (10).

The transmission unit 440 feeds back the channel correlation coefficient information calculated by the channel correlation information calculation unit 410 and the index information of the optimal matrix calculated by the index calculation unit 420 to the transmitter 110.

In this case, the transmission unit 440 may set the periods of the channel correlation coefficient information and the index of the optimal matrix to be different, and may transmit at least one of the channel correlation coefficient information and the index information of the optimal matrix to the transmitter. It is preferable that the index of the optimal matrix always be transmitted for each subcarrier and that the channel correlation coefficient information be transmitted at regular periods.

Figure 5:
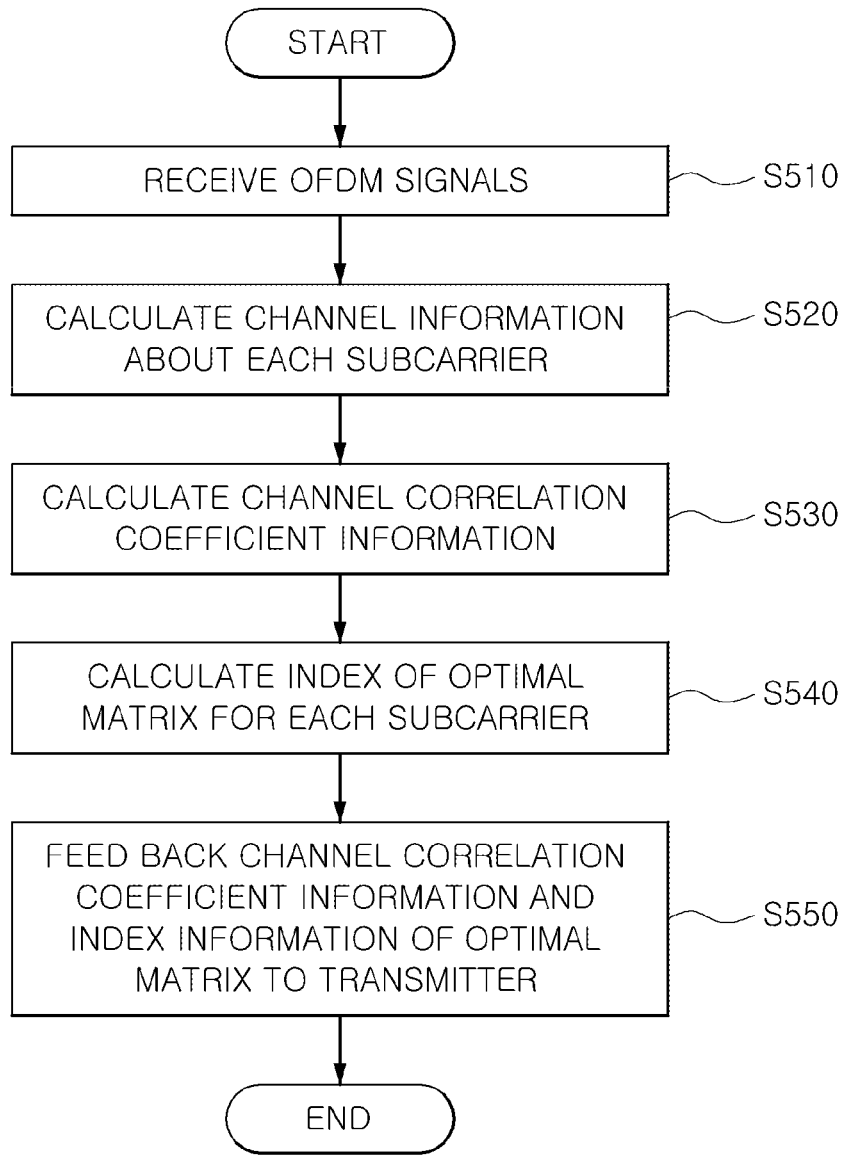
FIG. 5 is an operating flowchart showing a channel information generation method for spatial division multiplexing according to an embodiment of the present invention.

FIG. 5 is an operating flowchart showing a channel information generation method for spatial division multiplexing according to an embodiment of the present invention, and shows an operation performed by the receiver of a MIMO-OFDM wireless communication system.

Referring to FIG. 5, in the channel information generation method, the receiver receives OFDM signals from multiple transmitting antennas via spatial division multiplexing, and calculates channel information H(k) about each subcarrier using the received OFDM signals at step S510 and S520.

The receiver calculates channel correlation coefficient information between adjacent subcarriers on the basis of the calculated channel information about each subcarrier at step S530.

In this case, the channel correlation coefficient information can be calculated by the above Equation (8).

When the channel correlation coefficient information is calculated, the receiver calculates the index of the optimal matrix for each subcarrier at step S540.

In this case, the index of the optimal matrix can be calculated using the channel correlation coefficient information, the channel information, and random matrices constituting the codebook on the basis of, for example, either Equations (1) and (9) or Equations (1) and (10).

Of course, the index of the optimal matrix may also be calculated by additionally using channel information and estimated channel information about a previous subcarrier.

That is, the index of the optimal matrix may be calculated in such a way that channel information about a relevant subcarrier desired to be estimated is estimated based on the calculated channel correlation coefficient information, the random matrices constituting the codebook, and the estimated channel information about the previous subcarrier, and that the index of the optimal matrix for the relevant subcarrier is calculated based on the channel information and the estimated channel information about the relevant subcarrier.

The receiver feeds back both the channel correlation coefficient information and the index information of the optimal matrix, which have been calculated by the above process, to the transmitter at step S550.

In this case, the receiver can reduce the amount of feedback information by setting the transmission period of the channel correlation coefficient information. This is possible because the channel correlation coefficient information does not change rapidly with time.

By the above process, information to be fed back to the transmitter, that is, the channel correlation coefficient information about each subcarrier and the index of the optimal matrix of random matrices stored in the codebook, is generated.

Of course, when the receiver receives a cluster into which a plurality of adjacent subcarriers has been gathered, the receiver calculates channel correlation coefficient information about a predefined representative one of subcarriers constituting the cluster. Further, the receiver calculates the index of an optimal matrix for the representative subcarrier on the basis of the calculated channel correlation coefficient information, the channel information calculated by the receiver, and the random matrices stored in the codebook. Therefore, the receiver feeds back the channel correlation coefficient information and the index information of the optimal matrix to the transmitter. In this case, a codebook having the maximum value of the minimum geometric distance values between any two matrices constituting a relevant codebook in the set of codebooks is selected as the codebook of the receiver, as shown in Equation (11).

FIG. 6 is an operating flowchart showing a data transmission method using spatial division multiplexing according to an embodiment of the present invention, and shows an operation performed by the transmitter of the MIMO-OFDM wireless communication system.

Referring to FIG. 6, in the data transmission method, the transmitter receives information fed back from the receiver, that is, channel correlation coefficient information between OFDM subcarriers and the index information of an optimal matrix, and estimates channel information about a relevant subcarrier on the basis of the channel correlation coefficient information and the index information of the optimal matrix at steps S610 and S620.

In this case, the channel information about the subcarrier can be calculated using estimated previous channel information, a matrix corresponding to the index of the optimal matrix among random matrices stored in the codebook, and the channel correlation coefficient information. That is, the estimated channel information can be calculated by the above Equation (1).

When receiving channel correlation coefficient information about a representative subcarrier constituting the cluster and the index information of an optimal matrix for the representative subcarrier, the transmitter can estimate channel information about the representative subcarrier, and then estimate channel information about the remaining subcarriers constituting the cluster using the estimated channel information about the representative subcarrier.

In this case, the transmitter can estimate channel information about the remaining subcarriers using an interpolation technique, for example, a linear interpolation technique.

When the channel information about the relevant subcarrier is estimated, the transmitter generates a precoding matrix based on the estimated channel information, and precodes transmission data using the precoding matrix at steps S630 and S640.

The transmitter transmits the precoded transmission data to the receiver via the multiple transmitting antennas using spatial division multiplexing at step S650.

As described above, the channel information generation apparatus and method for spatial division multiplexing in a wireless communication system and the data transmission apparatus and method using generated channel information according to the present invention can be modified and applied in various forms within the range of the technical spirit of the present invention, and are not limited to the above embodiments. The above embodiments and drawings are only intended to describe the contents of the present invention in detail, and are not intended to limit the scope of the invention. Those skilled in the art will appreciate that various modifications, additions and substitutions are possible, without departing from the scope and spirit of the invention as disclosed in the accompanying claims. The scope of the present invention should be defined by the accompanying claims and equivalents thereof.

What is claimed is:

1. A channel information generation apparatus for spatial division multiplexing in an Orthogonal Frequency Division Multiplexing (OFDM)-based wireless communication system which uses Multiple-Input Multiple-Output (MIMO) antennas, the apparatus comprising:
a codebook storage unit configured to store a predefined codebook;
a channel correlation information calculation unit configured to receive channel information corresponding to each of subcarriers, and calculate channel correlation coefficient information between the subcarriers based on the channel information;
an index calculation unit configured to calculate an index of an optimal matrix of matrices included in the codebook stored in the codebook storage unit based on the channel information, the channel correlation coefficient information, and the codebook; and
a transmission unit configured to transmit the channel correlation coefficient information and index information about the index of the optimal matrix to a transmitter,
wherein the index calculation unit is configured to obtain estimated channel information about a k-th subcarrier of the subcarriers based on the channel correlation coefficient information, the codebook, and estimated channel information about a (k−1)-th subcarrier, and calculate an index of an optimal matrix for the k-th subcarrier based on the channel information and the estimated channel information about the k-th subcarrier.

2. The channel information generation apparatus according to claim 1, wherein the channel correlation information calculation unit is configured to calculate the channel correlation coefficient information using the following Equation (1):

$$\rho = \frac{E\{\tilde{h}^*(k)\tilde{h}(k-1)\}}{\sqrt{E\{\|\tilde{h}(k)\|^2\}}\sqrt{E\{\|\tilde{h}(k-1)\|^2\}}}, \quad (1)$$

$$\tilde{h}(k) = vec(H(k))$$

where ρ denotes the channel correlation coefficient information, k denotes an index of a subcarrier, H(k) denotes channel information and refers to a matrix indicating channel characteristics of the k-th subcarrier, vec(X) denotes an operator for sequentially arranging columns of a matrix X and configuring the columns in a form of a vector, * denotes a complex transpose, and E denotes an expectation operator.

3. The channel information generation apparatus according to claim 1, wherein the index calculation unit is configured to calculate the index of the optimal matrix using the following Equations (2) and (3):

$$\hat{H}(k) \approx \rho \hat{H}(k-1) + \sqrt{n_t}\sqrt{1-|\rho|^2}Z^* \quad (2)$$

where $n_t$ denotes a number of transmitting antennas, ρ denotes the channel correlation coefficient information, Z denotes a random matrix included in the codebook, k denotes an index of a subcarrier, $\hat{H}(k)$ denotes a matrix indicating estimated channel characteristics of the k-th subcarrier, and * denotes a complex transpose, and $$\hat{Z} = \underset{Z \in W}{\arg\max}\left(\log_2 \det\left(I_{N_s} + \frac{\varepsilon_s}{N_s N_0}\hat{F}^*(k)H^*(k)H(k)\hat{F}(k)\right)\right) \quad (3)$$

where $\hat{Z}$ denotes the index of the optimal matrix, $\hat{F}(k)$ denotes a matrix including first $N_S$ columns of a matrix obtained by performing a singular value decomposition process on $\hat{H}(k)$, $\varepsilon_s$ denotes power of a transmission signal, $N_0$ denotes a variance of additive noise components, $I_{N_s}$ denotes a unit matrix having a form of $N_s \times N_s$, and W denotes the codebook.

4. The channel information generation apparatus according to claim 1, wherein the index calculation unit is configured to calculate the index of the optimal matrix using the following Equations (4) and (5):

$$\hat{H}(k) \approx \rho \hat{H}(k-1) + \sqrt{n_t}\sqrt{1-|\rho|^2}Z^* \quad (4)$$

where $n_t$ denotes a number of transmitting antennas, ρ denotes the channel correlation coefficient information, Z denotes a random matrix included in the codebook, k denotes an index of a subcarrier, $\hat{H}(k)$ denotes a matrix indicating estimated channel characteristics of the k-th subcarrier, and denotes a complex transpose, and $$\hat{Z} = \underset{Z \in W}{\arg\min} tr\left(\frac{\varepsilon_s}{N_s}\left(I_{N_s} + \frac{\varepsilon_s}{N_s N_0}\hat{F}^*(k)H^*(k)H(k)\hat{F}(k)\right)^{-1}\right) \quad (5)$$

where $\hat{Z}$ denotes the index of the optimal matrix, $\hat{F}(k)$ denotes a matrix including first $N_s$ columns of a matrix obtained by performing a singular value decomposition process on Ĥ(k), $\epsilon_s$ denotes power of a transmission signal, $N_0$ denotes a variance of additive noise components, $I_{N_s}$ denotes a unit matrix having a form of $N_s \times N_s$, W denotes the codebook, and tr( ) denotes a trace operation of a matrix.

5. The channel information generation apparatus according to claim 1, wherein the codebook stored in the codebook storage unit is generated by the following Equation (6) and is then stored:

$$W = \arg \max_{X \in U_{n_t,N_s}^N} \delta(X) \quad (6)$$

$$\delta(X) = \min_{1 \leq i \leq j \leq N} \|X_i - X_j\|$$

where W denotes the codebook, $U_{n_t,N_s}^N$, denotes a set of codebooks each including of N ($n_t \times N_s$) matrices, in which individual column vectors of each matrix have orthonormal characteristics, and $\delta(X)$ denotes a geometric distance between any two matrices $X_i$ and $X_j$ included in a codebook X.

6. The channel information generation apparatus according to claim 1, wherein:
the channel correlation information calculation unit is configured to calculate channel correlation coefficient information about a predefined representative one of subcarriers included in a cluster into which a plurality of adjacent subcarriers is gathered, when information about the cluster is received,
the index calculation unit is configured to calculate an index of an optimal matrix corresponding to the representative subcarrier, and
the transmission unit is configured to transmit the channel correlation coefficient information and index information about the index of the optimal matrix, which correspond to the representative subcarrier, to a data transmission apparatus.

7. The channel information generation apparatus according to claim 1, wherein the transmission unit is configured to transmit the channel correlation coefficient information and the index information to a data transmission apparatus based on transmission periods of the channel correlation coefficient information and transmission periods of the index information, which have been differently set.

8. A data transmission apparatus using generated channel information for spatial division multiplexing in an Orthogonal Frequency Division Multiplexing (OFDM)-based wireless communication system that uses Multiple-Input Multiple-Output (MIMO) antennas, comprising:
a codebook storage unit configured to store a predefined codebook;
a reception unit configured to receive channel correlation coefficient information between subcarriers and index information from a receiver;
a channel estimation unit configured to for obtain estimated channel information based on the channel correlation coefficient information and a matrix corresponding to the index information among matrices included in the codebook; and
a precoding generation unit configured to generate precoding information so that data can be transmitted based on the estimated channel information via the spatial division multiplexing,
wherein the index calculation unit is configured to obtain estimated channel information about a k-th subcarrier of the subcarriers based on the channel correlation coefficient information, the codebook, and estimated channel information about a (k−1)-th subcarrier, and calculate an index of an optimal matrix for the k-th subcarrier based on the channel information and the estimated channel information about the k-th subcarrier.

9. The data transmission apparatus according to claim 8, wherein:
the reception unit is configured to receive the channel correlation coefficient information and the index information that correspond to a predefined representative one of a plurality of subcarriers included in a cluster, from the receiver, and
the channel estimation unit is configured to obtain the estimated channel information about the representative subcarrier based on the channel correlation coefficient information and the index information, which correspond to the representative subcarrier, and estimate channel information about remaining subcarriers other than the representative subcarrier based on the estimated channel information about the representative subcarrier.

10. The data transmission apparatus according to claim 9, wherein the channel estimation unit is configured to estimate the channel information about the remaining subcarriers other than the representative subcarrier via a linear interpolation technique by using the following Equation (7):

$$\hat{H}(mK+l) = \left(1 - \frac{l}{K}\right)\hat{H}(mK) + \frac{l}{K}\hat{H}(mK+K) \quad (7)$$

where K denotes a size of the cluster, m denotes an integer equal to or greater than 0, l denotes a difference between an index of a current subcarrier and that of the representative subcarrier, and Ĥ(mK) denotes an estimated channel matrix for a representative subcarrier of an (m+1)-th cluster.

11. The data transmission apparatus according to claim 8, wherein the channel estimation unit is configured to estimate the channel information about the subcarriers using the following Equation (8):

$$\hat{H}(k) \approx \rho\hat{H}(k-1) + \sqrt{n_t}\sqrt{1-|\rho|^2}Z^* \quad (8)$$

where $n_t$ denotes a number of transmitting antennas, $\rho$ denotes the channel correlation coefficient information, Z denotes a matrix corresponding to the index information among matrices included in the codebook, k denotes an index of a subcarrier, Ĥ(k) denotes estimated channel information and refers to estimated channel characteristics of a k-th subcarrier, and * denotes a complex transpose.

12. A channel information generation method for spatial division multiplexing in an Orthogonal Frequency Division Multiplexing (OFDM)-based wireless communication system that uses Multiple-Input Multiple-Output (MIMO) antennas, the method comprising:
receiving channel information corresponding to each of subcarriers;
calculating channel correlation coefficient information between the subcarriers based on the received channel information;
calculating an index of an optimal matrix of matrices included in a prestored codebook based on the received channel information, the channel correlation coefficient information, and the codebook; and transmitting the channel correlation coefficient information and index information about the index of the optimal matrix to a transmitter, wherein the calculating the index comprises:
estimating channel information about a k-th subcarrier based on the channel correlation coefficient information, the codebook, and estimated channel information of a (k−1)-th subcarrier; and
calculating an index of an optimal matrix for the k-th subcarrier based on the received channel information and the estimated channel information about the k-th subcarrier.

13. The channel information generation method according to claim 12, wherein the calculating the channel correlation coefficient information comprises calculating the channel correlation coefficient information using the following Equation (1):

$$\rho = \frac{E\{\tilde{h}^*(k)\tilde{h}(k-1)\}}{\sqrt{E\{\|\tilde{h}(k)\|^2\}}\sqrt{E\{\|\tilde{h}(k-1)\|^2\}}}, \quad (1)$$

$$\tilde{h}(k) = vec(H(k))$$

where ρ denotes channel correlation coefficient information, k denotes an index of a subcarrier, H(k) denotes channel information and refers to a matrix indicating channel characteristics of the k-th subcarrier, vec(X) denotes an operator for sequentially arranging columns of a matrix X and configuring the columns in a form of a vector, * denotes a complex transpose, and E denotes an expectation operator.

14. The channel information generation method according to claim 12, wherein the calculating the index comprises calculating the index of the optimal matrix using the following Equations (2) and (3):

$$\hat{H}(k) \approx \rho \hat{H}(k-1) + \sqrt{n_t}\sqrt{1-|\rho|^2} Z^* \quad (2)$$

where $n_t$ denotes a number of transmitting antennas, ρ denotes the channel correlation coefficient information, Z denotes a random matrix included in the codebook, k denotes an index of a subcarrier, $\hat{H}(k)$ denotes a matrix indicating estimated channel characteristics of the k-th subcarrier, and * denotes a complex transpose, and $$\hat{Z} = \underset{Z \in W}{\arg\max}\left(\log_2 \det\left(I_{N_s} + \frac{\varepsilon_s}{N_s N_0}\hat{F}^*(k)H^*(k)H(k)\hat{F}(k)\right)\right) \quad (3)$$

where $\hat{Z}$ denotes the index of the optimal matrix, $\hat{F}(k)$ denotes a matrix including first $N_s$ columns of a matrix obtained by performing a singular value decomposition process on $\hat{H}(k)$, $\varepsilon_s$ denotes power of a transmission signal, $N_0$ denotes a variance of additive noise components, $I_{N_s}$ denotes a unit matrix having a form of $N_s \times N_s$, and W denotes the codebook.

15. The channel information generation method according to claim 12, wherein the calculating the index comprises calculating the index of the optimal matrix using the following Equations (4) and (5):

$$\hat{H}(k) \approx \rho \hat{H}(k-1) + \sqrt{n_t}\sqrt{1-|\rho|^2} Z^* \quad (4)$$

where $n_t$ denotes a number of transmitting antennas, ρ denotes the channel correlation coefficient information, Z denotes a random matrix included in the codebook, k denotes an index of a subcarrier, $\hat{H}(k)$ denotes a matrix indicating estimated channel characteristics of the k-th subcarrier, and * denotes a complex transpose, and $$\hat{Z} = \underset{Z \in W}{\arg\min}\, tr\left(\frac{\varepsilon_s}{N_s}\left(I_{N_s} + \frac{\varepsilon_s}{N_s N_0}\hat{F}^*(k)H^*(k)H(k)\hat{F}(k)\right)^{-1}\right) \quad (5)$$

where $\hat{Z}$ denotes the index of the optimal matrix, $\hat{F}(k)$ denotes a matrix including of first $N_s$ columns of a matrix obtained by performing a singular value decomposition process on $\hat{H}(k)$, $\varepsilon_s$ denotes power of a transmission signal, $N_0$ denotes a variance of additive noise components, $I_{N_s}$ denotes a unit matrix having a form of $N_s \times N_s$, W denotes the codebook, and tr( ) denotes a trace operation of a matrix.

16. The channel information generation method according to claim 12, wherein the codebook is generated by the following Equation (6), and is then stored:

$$W = \arg\underset{X \in U_{n_t,N_s}^N}{\max}\, \delta(X) \quad (6)$$

$$\delta(X) = \underset{1 \leq i \leq j \leq N}{\min} \|X_i - X_j\|$$

where W denotes the codebook, $U_{n_t,N_s}^N$ denotes a set of codebooks each including N ($n_t \times N_s$) matrices, in which individual column vectors of each matrix have orthonormal characteristics, and δ(X) denotes a geometric distance between any two matrices $X_i$ and $X_j$ included in a codebook X.

17. The channel information generation method according to claim 12, wherein:
the calculating the channel correlation coefficient information is performed such that when information about a cluster into which a plurality of adjacent subcarriers has been gathered is received, channel correlation coefficient information about a predefined representative one of the subcarriers included in the cluster is calculated, and
the calculating the index is performed to calculate an index of an optimal matrix corresponding to the representative subcarrier.

18. A data transmission method using generated channel information for spatial division multiplexing in an Orthogonal Frequency Division Multiplexing (OFDM)-based wireless communication system that uses Multiple-Input Multiple-Output (MIMO) antennas, the method comprising:
receiving channel correlation coefficient information between subcarriers and index information from a receiver;
estimating channel information based on the channel correlation coefficient information and a matrix corresponding to the index information among matrices included in a codebook; and
generating precoding information so that data is transmitted based on the estimated channel information via the spatial division multiplexing, wherein the index calculation unit is configured to obtain estimated channel information about a k-th subcarrier of the subcarriers based on the channel correlation coefficient information, the codebook, and estimated channel information about a (k−1)-th subcarrier, and calculate an index of an optimal matrix for the k-th subcarrier based on the channel information and the estimated channel information about the k-th subcarrier.

19. The data transmission method according to claim 18, wherein the receiving the index including receiving index information corresponding to a predefined representative one of a plurality of subcarriers included in a cluster from the receiver, and wherein the estimating the channel information comprises:

estimating channel information about the representative subcarrier based on the channel correlation coefficient information and the index information corresponding to the representative subcarrier; and estimating channel information about remaining subcarriers other than the representative subcarrier based on the estimated channel information for the representative subcarrier.

20. The data transmission method according to claim 19, wherein the estimating the channel information comprises estimating the channel information about the remaining subcarriers other than the representative subcarrier via a linear interpolation technique using the following Equation (7):

$$\hat{H}(mK+l) = \left(1 - \frac{l}{K}\right)\hat{H}(mK) + \frac{l}{K}\hat{H}(mK+K) \qquad (7)$$

where K denotes a size of the cluster, m denotes an integer equal to or greater than 0, l denotes a difference between an index of a current subcarrier and that of the representative subcarrier, and $\hat{H}(mK)$ denotes an estimated channel matrix for a representative subcarrier of an (m+1)-th cluster.

21. The data transmission method according to claim 18, wherein the estimating the channel information comprises estimating the channel information about the subcarriers using the following Equation (8):

$$\hat{H}(k) \approx \rho \hat{H}(k-1) + \sqrt{n_t}\sqrt{1-|\rho|^2}Z^* \qquad (8)$$

where $n_t$ denotes a number of transmitting antennas, $\rho$ denotes the channel correlation coefficient information, Z denotes a matrix corresponding to the index information among matrices included in the codebook, k denotes an index of a subcarrier, $\hat{H}(k)$ denotes estimated channel information and refers to estimated channel characteristics of a k-th subcarrier, and * denotes a complex transpose.

* * * * *